United States Patent [19]

Curran

[11] Patent Number: 5,765,207
[45] Date of Patent: Jun. 9, 1998

[54] RECURSIVE HARDWARE STATE MACHINE

[75] Inventor: Brian William Curran, Saugerties, N.Y.

[73] Assignee: International Business Machines Corporation, Armonk, N.Y.

[21] Appl. No.: 768,048

[22] Filed: Dec. 16, 1996

Related U.S. Application Data

[63] Continuation of Ser. No. 81,038, Jun. 22, 1993, abandoned.

[51] Int. Cl.⁶ ........................................ G06F 12/10
[52] U.S. Cl. .................................. 711/203; 711/206
[58] Field of Search ............................ 711/203, 206, 711/207

[56] References Cited

U.S. PATENT DOCUMENTS

| 4,695,950 | 9/1987 | Brandt et al. | 395/207 |
| 5,042,004 | 8/1991 | Agrawal et al. | 395/590 |

OTHER PUBLICATIONS

"Enterprise Systems Architecture/370; An architecture for multiple virtual space access and authorization," C.A. Scalzi, A.G. Ganek, R.J. Schmalz, IBM Systems Journal, vol. 28, No. 1, pp. 15–38, 1989.

"Multiple Operating Systems on One Processor Complex," T.L. Borden, J.P. Hennessy, J.W. Rymarczyk, IBM System Journal, vol. 28, No. 1, pp. 104–123, 1989.

"ESA/390 Interpretive Execution Architecture, Foundation for VM/ESA," D.L. Osisek, K.M. Jackson, P.H. Gum, IBM Systems Journal, vol. 30, No. 1, pp. 34–51, 1991.

"Concepts of Enterprise Systems Architecture/370," K.E. Plambeck, IBM Systems Journal, vol. 28, No. 1, pp. 39–61, 1989.

*Primary Examiner*—Jack A. Lane
*Attorney, Agent, or Firm*—Lynn L. Augspurger; Laurence J. Marhoefer

[57] ABSTRACT

A state machine computing system provides multiple state registers, a recursive hardware state machine computing system; particularly address translation hardware which can be used in multiprocessors, parallel machines and massively parallel machines. The hardware state machine includes a mechanism to push values into a state register stack and to pop values from the state register stack. The stack consists of a plurality of state registers, one of which is designated the current state register and the remainder designated as prior (or saved) state registers. Recursive logic is provided to increment the current state register. The recursive state machine described provides significant advantages over prior art hardware implementations of guest virtual address translation because guest virtual address translations recursively invoke host virtual address translation.

2 Claims, 9 Drawing Sheets

RECURSIVE HARDWARE STATE MACHINE

This application is a continuation of prior complete application Ser. No. 08/081,038, filed Jun. 22, 1993, now abandoned.

FIELD OF THE INVENTION

This invention relates to computer state sequencers and particularly to address translation hardware which can be used in multiprocessors, parallel machines and massively parallel machines.

GLOSSARY OF TERMS

While dictionary meanings are also implied by certain terms used here, the following glossary of some terms may be useful.

Virtual address
  An address in a virtual (non-real) address space
Real address
  An address in a real or physically installed address space
ALET or Access List Entry Token
  High order portion of a virtual address
DAT or Dynamic Address Translation
  Process by which the low order part of a virtual address is converted to a real (or physical) address
ART or Access Register Translation
  Process by which an access list entry token is converted to an address space identifier
ASTE or Address Space 2nd Table Entry
  Control block of operating system which identifies an address space
STO or Segment Table Origin
  Portion of the address space identifier that points to the segment table
PTO or Page Table Origin
  Real address which points to origin of page table
TLB or Translation Lookaside Buffer
  A buffer which contains the most recent virtual to real translations
EAX or extended authorization index
  Index associated a program which is used to index into an extended authority table
ALX or access list index
  Portion of a virtual address which is used to index into a access list
SX or segment index
  Portion of a virtual address which is used to index into a segment table
PX or page index
  Portion of a virtual address which is used to index into a page table

REFERENCES USED IN THE DISCUSSION OF THE INVENTION

During the detailed description which follows the following works will be referenced as an aid for the reader. These additional references are 1. "Enterprise Systems Architecture/370: An architecture for multiple virtual space access and authorization," C. A. Scalzi, A. G. Ganek, and R. J. Schmalz IBM Systems Journal, Vol. 28, No.1, 1989, pp.15-38.
2. "Multiple Operating Systems on One Processor Complex,"T. L. Borden, J. P. Hennessy, and J. W. Rymarczyk, IBM Systems Journal, Vol. 28, No.1, 1989, pp.104-123.
3. "ESA/390 Interpretive Execution Architecture, Foundation for VM/ESA," D. L. Osisek, K. M. Jackson, P. H. Gum, IBM Systems Journal, Vol. 30, No.1, 1991, pp.34-51.
4. "Concepts of Enterprise Systems Architecture/370," K. E. Plambeck, IBM Systems Journal Vol. 28, No.1, 1989, pp.39-61.

These additional references are incorporated by reference.

BACKGROUND OF THE INVENTION

There are numerous advantages provided for programs which execute in a virtual address space. The programs instructions and data needn't be limited to the physically installed address range. Also programs operating concurrently in a computing system needn't be statically assigned part of the physically installed address range. The control program (or operating system) of a machine can dynamically allocate physical or real storage to programs executing in virtual address spaces. (see reference 1).

Prior to accessing physical or real storage, however, a program's virtual address must be translated to a physical address via a table or set of tables in real storage. This translation is generally performed by hardware to prevent excess delays in the storage access path. In addition, a translation lookaside table (TLB) which holds the most recently translated virtual addresses and their corresponding real addresses is often implemented. In this manner many translation operations can be entirely avoided even though conceptually all virtual addresses must be translated before accessing storage.

Computer hardware can be subdivided into multiple, independent computing systems. (Reference 2) This partitioning of a system creates multiple virtual machines which, like virtual storage, provides many advantages. Emulation of architectures not directly supported by the real hardware is permitted in a virtual machine environment. Multiple virtual machines permit diverse work-loads, such as batch, interactive and transaction processing to coexist on the same physical machine. A virtual machine is often referred to as a guest; the control program which directly manages the real resources of the machine is often referred to as the host. (Reference 3)

Portions of real storage may be statically assigned to each virtual machine or real storage may be dynamically assigned to each virtual machine. When guest real storage is dynamically assigned to host real storage two sets of translation tables are required: guest translation tables and host translation tables. The guest translation process uses both sets of tables. Guest translation is often suspended to perform a 'lower-level' host translation. A guest translation generally invokes the same steps as a host translation and thus the guest translation process is recursive by nature.

A machine which incorporated the prior techniques for translation was the ES/9021 processor of International Business Machines Corporation. That machine, like the present machine, may be used in a clustered computing environment.

SUMMARY OF THE INVENTION

Our invention substantially reduces design complexity for machines which can implement dynamic address translation, access register translation, and permits architectural growth even with greater than 31 bit guest or virtual machines in a computer system which may be a multi-processor, a parallel processor or a massively parallel machine. Our advance requires fewer cells and inherently less complex sequencer logic than would be otherwise required. It provides for use of multiple state registers and improvements which achieve a recursive hardware state machine computing system and particularly to address translation hardware which can be used in multi-processors, parallel machines and massively parallel machines. These improvements are accomplished by providing a mechanism to transfer one state register value to another state register. Specifically the multiple state registers are organized as a stack. A push mechanism is defined which causes state register values to PUSHed down into the stack and a pop mechanism is defined which causes state register values to POPed up from the stack. In addition the invention provides for a simplified means to operate a state machine when states are executed sequentially.

These and other improvements are set forth in the following detailed description. For a better understanding of the invention with advantages and features, refer to the description and to the drawings.

BRIEF DESCRIPTION OF THE DRAWINGS.

FIGS. 5 and 6 show the state transition diagram for the preferred embodiment where

Our detailed description explains the preferred embodiments of our invention together with advantages and features, by way of example with reference to the following drawings.

DETAILED DESCRIPTION OF THE INVENTION

Figure 1:
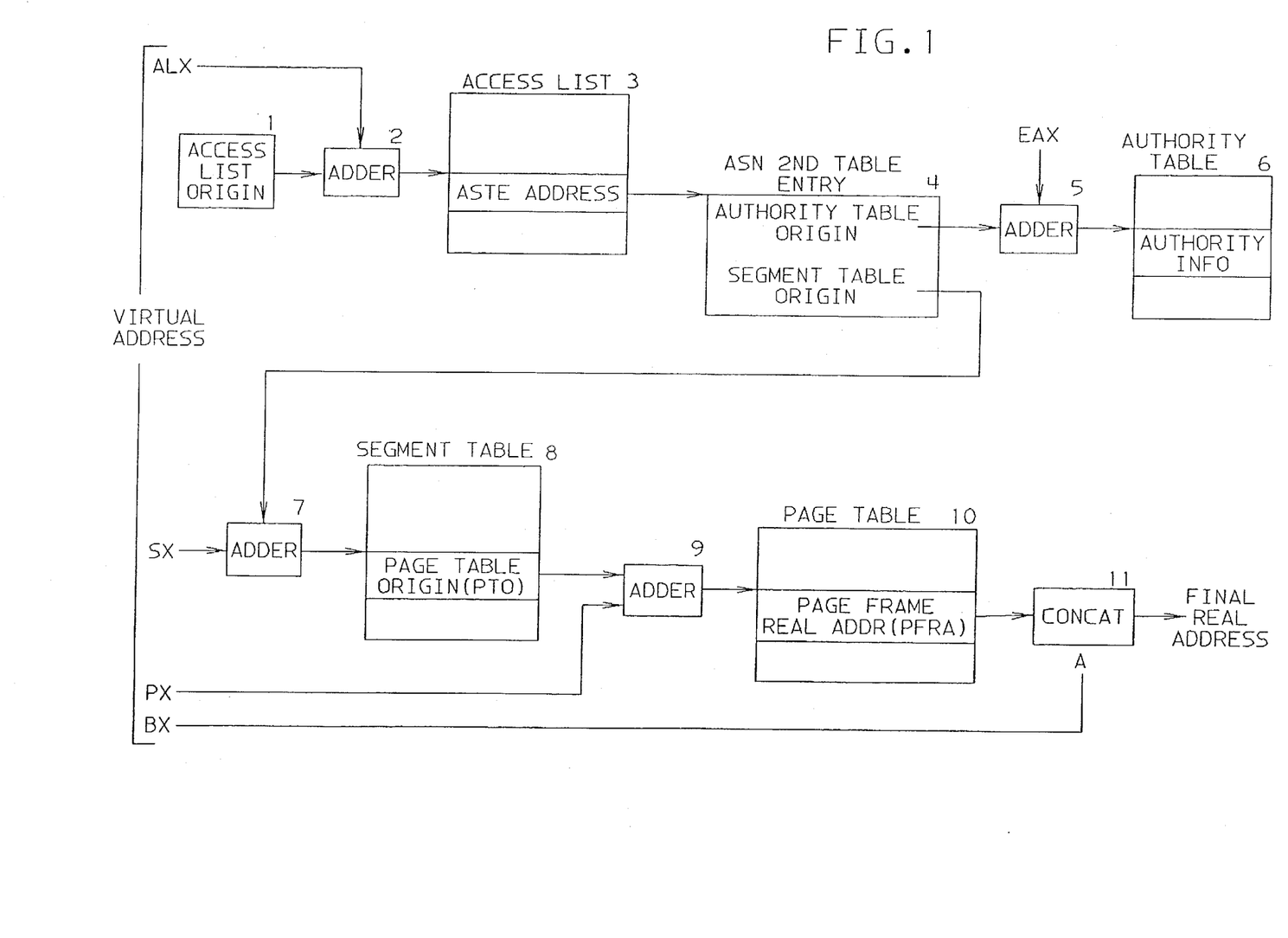
FIG. 1 shows the states for a typical virtual to real address translation sequence.

Before considering our preferred embodiments in detail, it may be worth-while to illustrate, by way of example, a typical address translation sequence as shown in FIG. 1.

A virtual address must be translated to a real address prior to accessing real storage. A virtual address is generally subdivided into separate portions which are used to index into different translation tables. FIG. 1 shows a specific example of the IBM S/390 virtual address translation. The invention set forth, however, is applicable to any virtual address translation. In the S/390 architecture the virtual address is subdivided into an ACCESS LIST INDEX (ALX), a segment index (SX), a page index (PX) and byte index (BX). The ALX is used to index into the access list; the SX is used to index into the segment table; and the PX is used to index into the page table. BX is the lowest portion of the virtual address and is not translatable, i.e. it is not used to index into a translation table. The ALX and access list origin 1 are supplied to adder 2. The resulting address points to an entry in the access list 3. This access list entry provides a pointer to the address space descriptor or Address Space Number (ASN) second table entry 4. The ASN second table entry 4 contains an authority table origin and a segment table origin. The IBM S/390 architecture defines an extended authorization means for verifying that a program is authorized to access an address space. This authority mechanism is described in reference 4.

When extended authorization checks are required the authority table origin and EAX (extended authority index) are supplied to adder 5. The resulting address points to a extended authority bit within the authority table 6. This bit indicates whether or not the program is authorized to access the address space associated with the ASN 2nd table entry 4. Assuming the program is authorized the segment table origin within the ASN 2nd table entry 4 and SX portion of the virtual address are supplied to adder 7. The resulting address points to an entry in the segment table 8. The segment table entry contains a page table origin. This page table origin and PX portion of the virtual address are supplied to adder 9. The resulting address points to an entry in the page table 10. The page table entry provides a page frame real address. The page frame real address and BX are provided to the concatenation element 11 which outputs the final teal address.

Figure 2A:
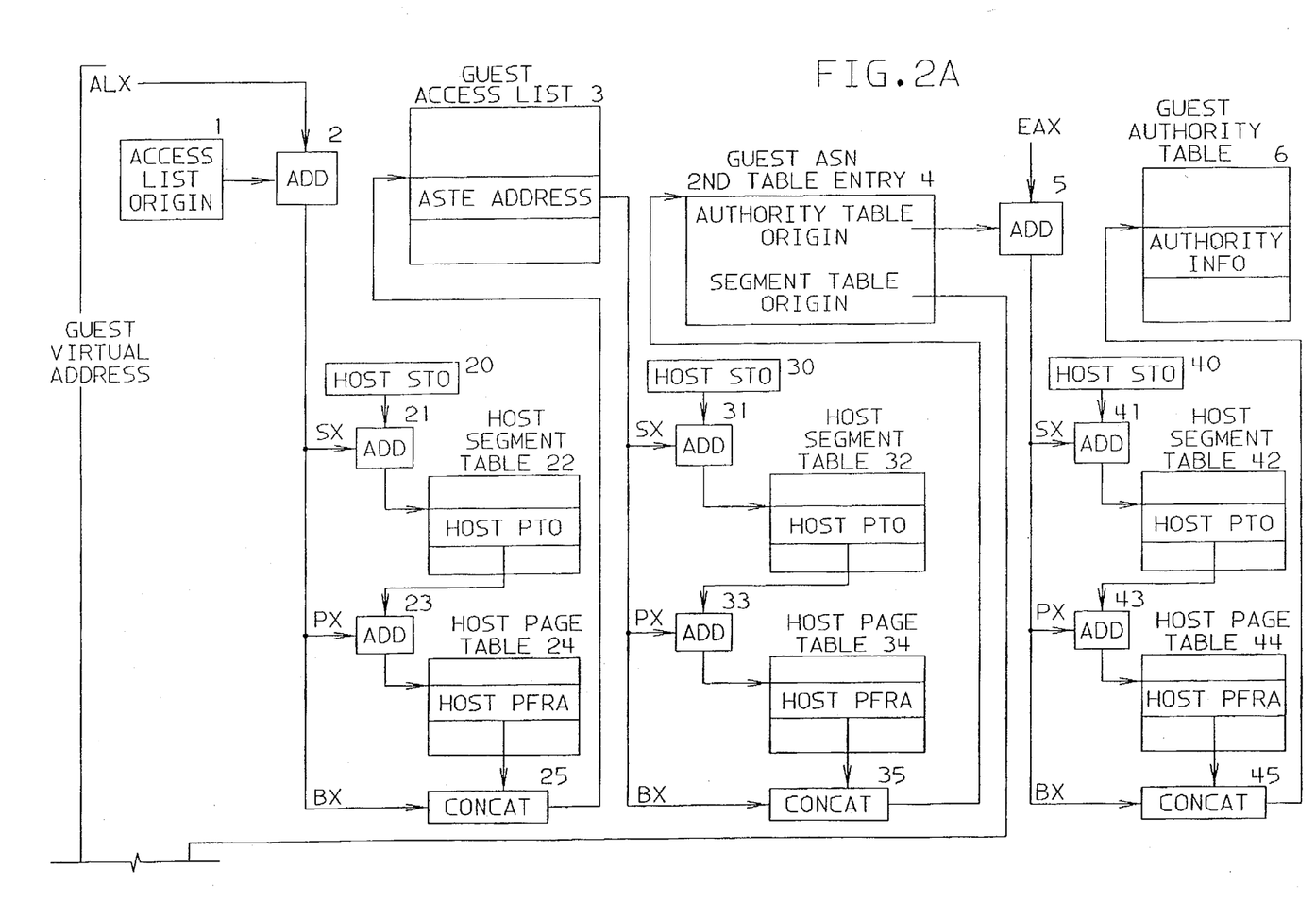
FIG. 2 shows the states for a typical guest virtual to real address translation sequence.
Figure 2B:
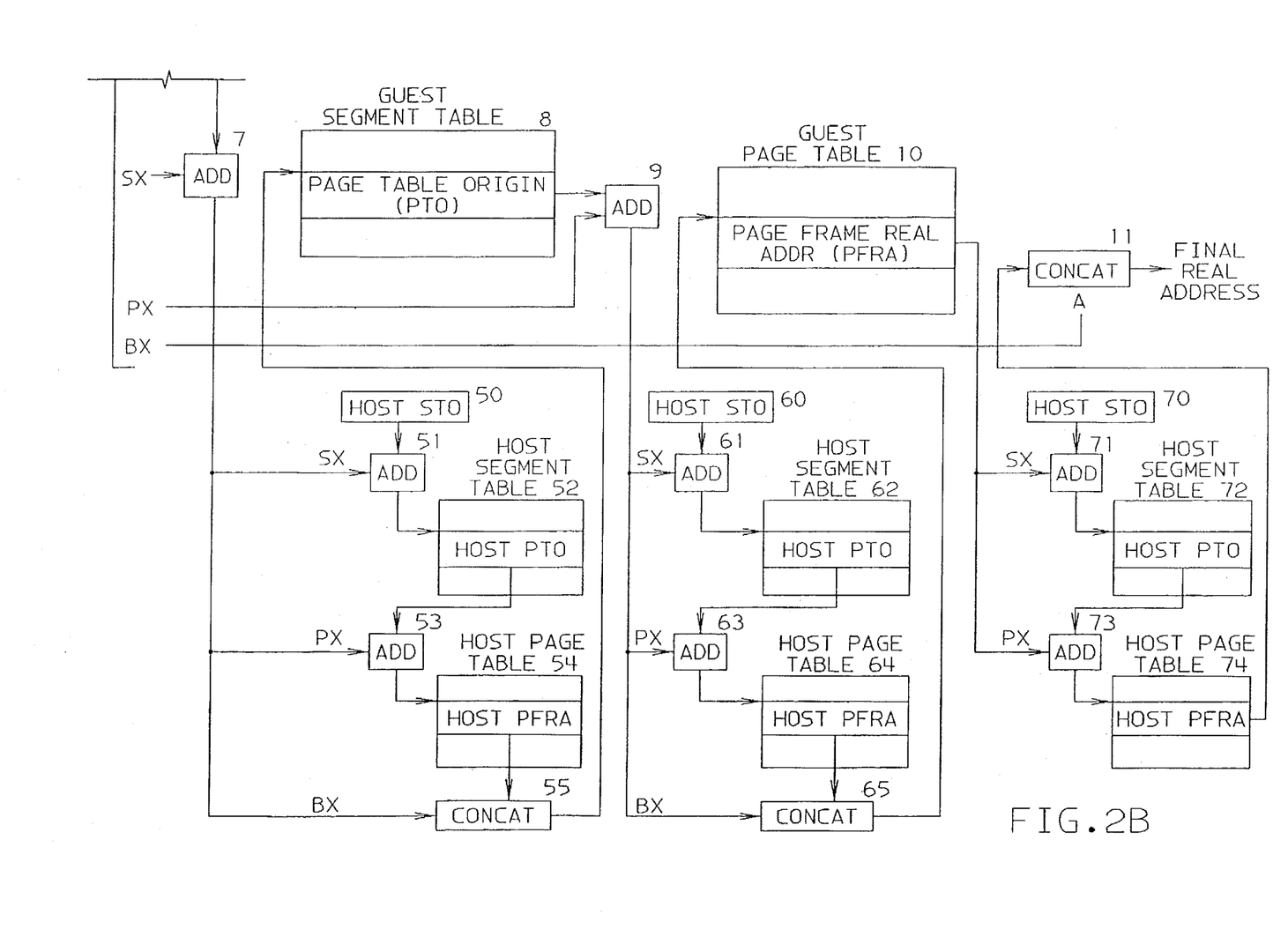

FIG. 2 shows a specific example of a IBM S/390 guest virtual address translation. A guest virtual address is generally subdivided into separate portions which are used to index into different guest translation tables. In the S/390 architecture the virtual address is subdivided into an access list index (ALX), a segment index (SX), a page index (PX) and byte index (BX). The ALX is used to index into the access list; the SX is used to index into the segment table; and the PX is used to index into the page table. BX is the lowest portion of the virtual address and is not translatable. The ALX and access list origin 1 are supplied to adder 2. The resulting address is a guest real address which requires further translation before accessing host real storage. The guest real address or host virtual address output from adder 2 is comprised of a segment index, SX, page index, PX, and byte index, BX.

The HOST segment table origin (STO) 20 and SX from adder 2 are provided to adder 21 which outputs a host real address. This address points to an entry in the host segment table 22. The host segment table entry contains a HOST page table origin (PTO). The HOST page table origin and PX from adder 2 are provided to the adder 23 which outputs a host real address. This address points to an entry In the host page table 24. The host page table entry contains a HOST page frame real address (PFRA). The host PFRA and BX from adder 2 are supplied to the concatenation element 25 which outputs a host real address. This host real address is then used to access an entry in the Guest access list 3.

This access list entry contains the guest real address of the address space descriptor or Address Space Number (ASN) second table entry 4. This guest real address requires further translation. The HOST segment table origin (STO) 30 and SX portion of the guest real address are provided to adder 31 which indexes into host segment table 32. The PTO of the host segment table entry is then supplied to the adder 33 where it is added with PX of the guest real address. The address output of adder 33 indexes into the host page table 34. The host page table entry is supplied to concatenation element 35 where it is concatenated with BX of the guest real address. This host real address output from concatenation element 35 is then used to access the Guest ASN second table entry 4.

The ASN second table entry 4 provides an authority table origin and a segment table origin. The IBM S/390 architecture defines an extended authorization means for verifying that a program is authorized to access an address space.

When extended authorization cheeks are required the authority table origin and EAX (extended authority index) are supplied to adder 5. The resulting guest real or host virtual address requires further translation to obtain the host real address. The HOST segment table origin (STO) 40 and SX from adder 5 are provided to adder 41 which indexes into host segment table 42. The PTO of the host segment table entry is then supplied to the adder 43 where it is added with PX of the host virtual address. The address output of adder 43 indexes into the host page table 44. The host page table entry is supplied to concatenation element 45 where it is concatenated with BX of the host virtual address. This host real address output of element 45 accesses or points to an extended authority bit within the authority table. This bit indicates whether or not the program is authorized to access the address space associated with the ASN 2nd table entry 4.

Assuming the program is authorized the segment table origin within the ASN 2nd table entry 4 and SX portion of the guest virtual address are supplied to adder 7. The address output from adder 7 is a guest real or host virtual address which requires further translation to obtain the lost real address. The HOST segment table origin (STO) 50 and SX from adder 7 are provided to adder 51 which indexes into host segment table 52. The PTO of the the host segment table entry is then supplied to the adder 53 where it is added with PX of the host virtual address. The address output of adder 53 indexes into the host page table 54. The host page table entry is supplied to concatenation element 55 where it is concatenated with BX of the host virtual address. This host real address output of element 55 accesses an entry in the Guest segment table 8.

The guest segment table entry provides a guest page table origin. This page table origin and PX portion or the guest virtual address are supplied to adder 9. The address output from adder 9 is a guest real or host virtual address which requires further translation to obtain the host real address. The HOST segment table origin (STO) 60 and SX output of adder 9 are provided to adder 61 which indexes into host segment table 62. The PTO of the host segment table entry is then supplied to the adder 63 where it is added with PX of the host virtual address. The address output of adder 63 indexes into the host page table 64. The host page table entry is supplied to concatenation element 65 where it is concatenated with BX of the host virtual address. The host real address output of concatenation element 65 accesses entry in the Guest page table 10.

The guest page table entry provides a guest page frame real address or PFRA. This PFRA is a guest real or host virtual address which requires further translation to obtain the host real address. The HOST segment table origin (STO) 70 and SX portion of the guest PFRA are provided to adder 71 which indexes into host segment table 72. The PTO of the host segment table entry is then supplied to the adder 73 where it is added with the PX of the guest PFRA. The address output of adder 73 indexes into the host page table 74. The host page table entry contains the host PFRA. This PFRA is supplied to concatenation element 11 where the BX portion of the original guest virtual address is concatenated to provide the final host real address.

Figure 3:
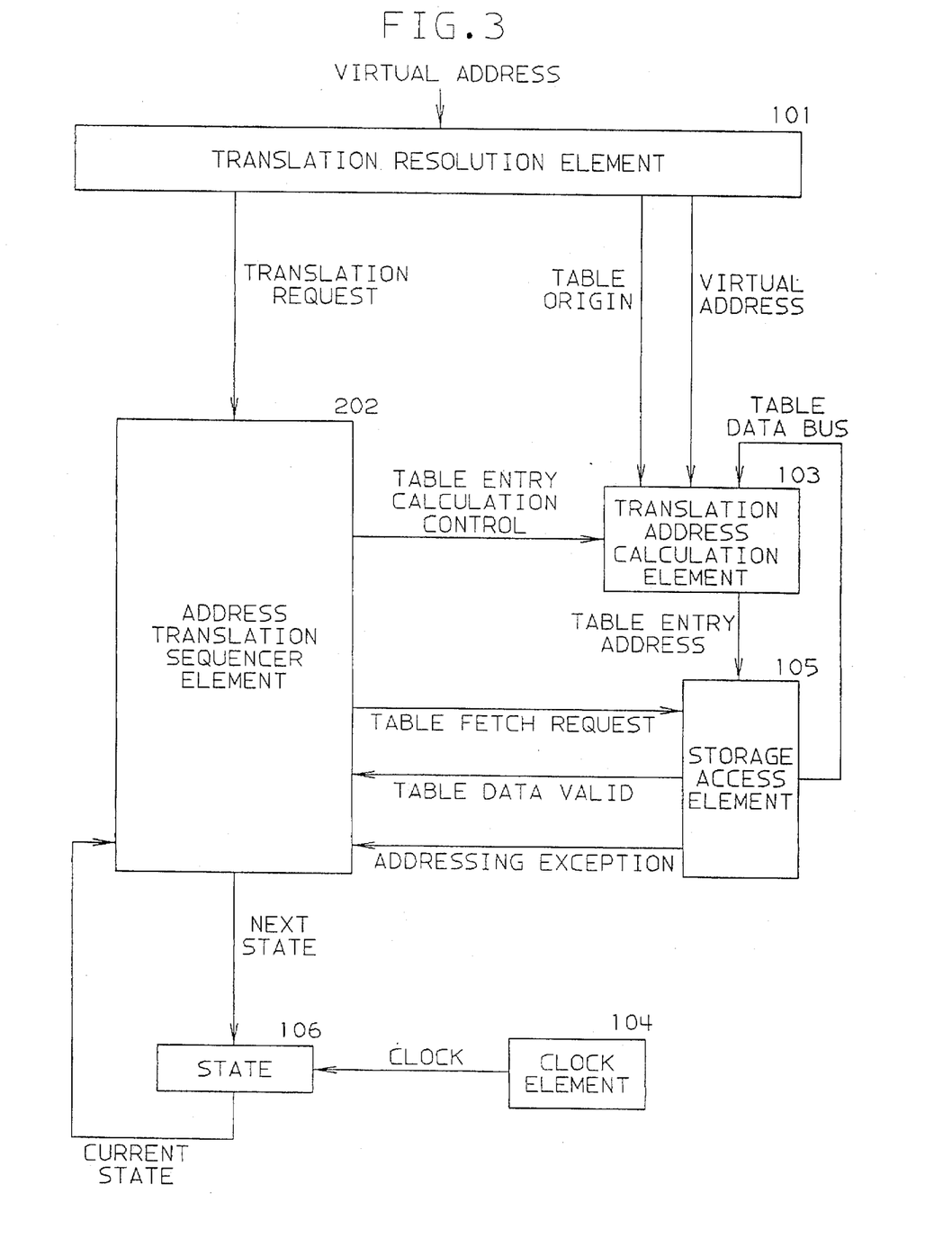
FIG. 3 shows a conventional address translation means.

A conventional address translation state machine is illustrated in FIG. 3. It consists of a translation resolution element 101, which receives a virtual address. When the translation resolution element 101 cannot resolve the virtual address (i.e. when it cannot find the corresponding real address) it outputs the virtual address, a table origin, and a translation request. Typically the translation resolution element maintains a TLB so it can resolve virtual addresses which have been recently translated to a real address.

The translation request signal is input to the translator and instructs it to perform a specific translation sequence. Generally the translator consists of an address translation sequencer element 102 (hereafter referred to as sequencer), a translation state register 106, and a translation address calculation element 103. The virtual address and table origin provided by translation resolution element 101 are passed to the translation address calculation element 103.

Upon activation of the translation request signal the sequencer 102 outputs a next state value equal to the initial state of the translation sequence to the translation state register 106. A clock element 104 then provides a clock to latch this next state into state register 106. In the subsequent clock cycle, the current state is input to the sequencer 102. This causes the sequencer 102 to output a table entry calculation control instructing the address calculation element 103 to add the table origin output from the translation resolution element 101 and table index (portion of the virtual address output from the translation resolution element). The resulting real table entry address is output from the address calculation element 103 to the storage access element 105. The sequencer 102 also outputs a table fetch request to tile storage access element 105. The clock element 104 then provides a clock to latch the next state output from the sequencer 102 into the state register 106. This state is a wait state in which the sequencer 102 waits until the requested table data is returned.

The primary function of the storage access element 105 is to find the requested data, access it and return it to the requestor (which in this case is the translator). Typically data may reside in a processor's cache, in a second-level cache or in main memory. When the storage access element 105 finds the requested data within this storage hierarchy it accesses the data and provides it on the table data bus to the address calculation element 103 and indicates that the data was found by outputting table data valid to the sequencer 102.

Upon receipt of table data valid from the storage access element 105 the translator sequencer 102 outputs a next state to the state register 106. The clock element 104 then provides a clock to latch the next state into the state register 106.

Each translation step is assigned a unique state. This is the means by which a conventional address translation sequences the translation process.

Figure 4:
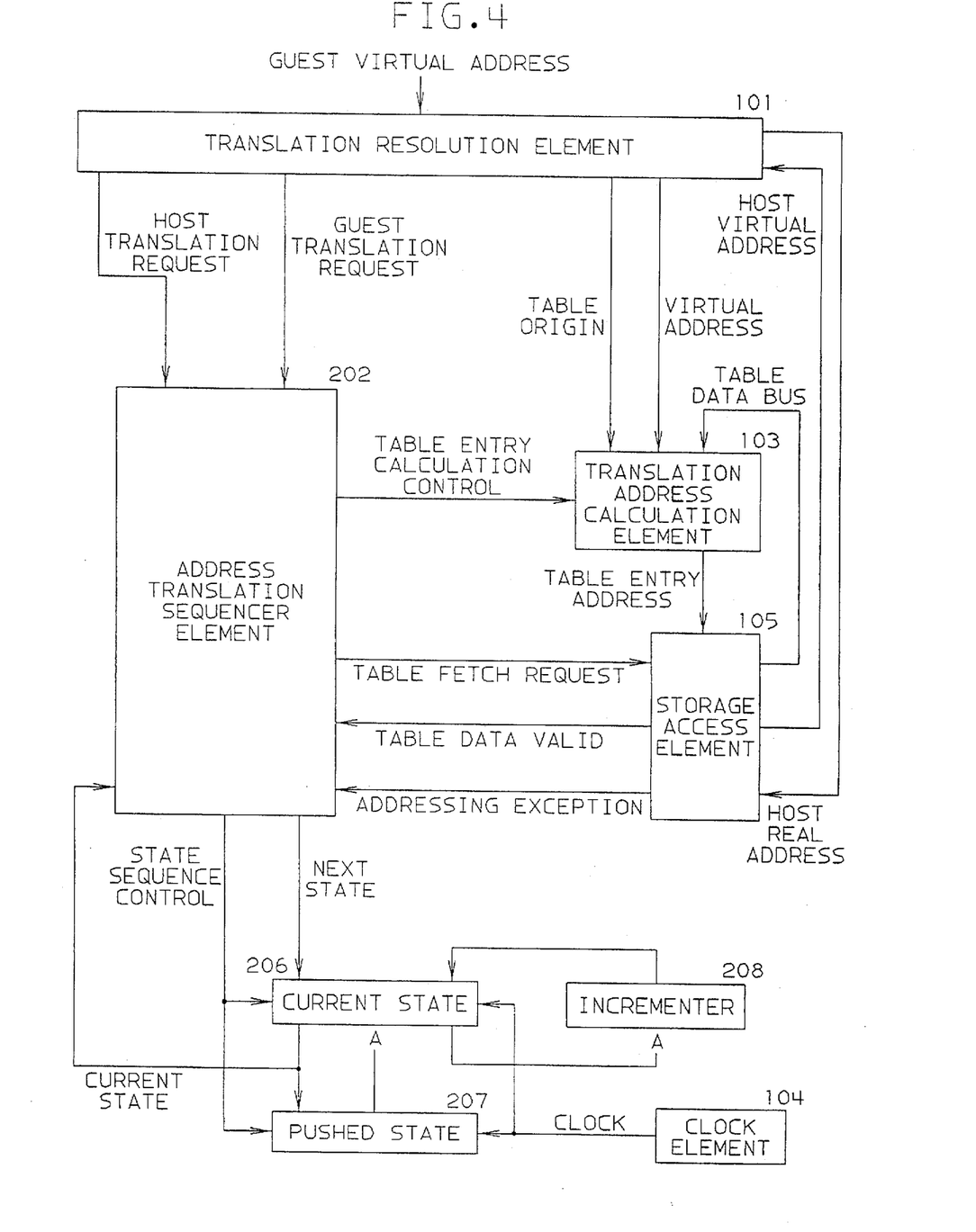
FIG. 4 shows tile address translation state machine according to the invention.

FIG. 4 illustrates an address translator according to the invention. It consists of a translation resolution element 101, which receives a guest virtual address. When the translation resolution element 101 cannot resolve the virtual address (i.e. when it cannot find the corresponding real address) it outputs the virtual address, a table origin, and a guest translation request. Typically the translation resolution element maintains a TLB so it can resolve virtual addresses which have been recently translated to a real address.

The guest translation request is input to the translator which instructs the translator to perform a specific translation sequence. The translator consists of an address translation sequencer element 202 (hereafter referred to as sequencer) a current state register 206, a pushed state register 207 an incrementer 208, and a translation address calculation element 103. The virtual address and table origin provided by translation element 101 are passed to the translation address calculation element 103.

Upon activation of this guest translation request signal the sequencer 202 outputs a next state value equal to the initial state of the translation sequence to the current state register 206 and outputs a state sequence control which activates the next state output to current state register 206 input path. A clock element 104 then provides a clock to latch this next state into state register 206. In the subsequent clock cycle, the current state is input to sequencer 202 and the sequencer outputs a table entry calculation control instructing the address calculation element 103 to acid the table origin output from translation resolution element 101 and table index (portion of the virtual address output from the translation resolution element 101). The address calculation element 102 outputs the resulting real table entry address to the storage access element 105. The sequencer 202 also outputs a table fetch request to the storage access element 105. The clock element 104 then provides a clock to latch the next state output from the sequencer 202 into the current state register 206. This state is a wait state in which the sequencer 202 waits until the requested table data is returned.

The primary function of the storage access element 105 is to find the requested data, access it and return it to the requester (which in this case is the translator). Typically data may reside in a processor's cache, in a second-level cache or in main memory. When the storage access element 105 finds the requested data within this storage hierarchy it accesses the data and provides it on the table data bus to the address calculation element 103 and indicates that the data was found by outputting table data valid to the sequencer 202. If the storage access element cannot obtain the data because the table entry address it was provided was a guest real address (i.e. a host virtual address) it outputs the host virtual address to the translation resolution element 101. If the TLB within the translation resolution element 101 contains the requested translation then it provides the host real address to the storage access element 105. The storage access element 105 then accesses the table entry. If however the TLB does not contain the needed translation then it outputs host translation request to the sequencer 202.

Upon activation of the host translation request the sequencer 202 outputs a next state value equal to the initial state of the host translation sequence to the current state register 206 and it outputs a state sequence control signal which activates the next state output to current state register 206 input path and activates the current state register 206 output to pushed state register 207 input path.

A clock element 104 then provides a clock to latch the next state into current state register 206 and the current state register 206 output into the pushed state register 207. In the subsequent clock cycle, the current state is input to the sequencer 202 and the sequencer outputs a table entry calculation control instructing the address calculation element 103 to add the host table origin output from translation resolution element 101 and table index (portion of the virtual address supplied from the translation resolution element). The resulting real table entry address is output from the address calculation element 103 to the storage access element 105. The sequencer 202 also outputs a table fetch request to the storage access element 105 and outputs a state sequence control signal which activates the next state to current state register 206 path and deactivates the ingating of pushed state register 207. The clock element 104 then provides a clock to latch the next state outputted by the sequencer 202 into the current state register 206. This state is a wait state in which the sequencer 202 waits until the requested host table data is returned.

After sequencing through the states of the host translation sequence the sequencer 202 outputs a state sequence control which activates the pushed state register 207 output to current state register 206 input path. The clock element 104 then provides a clock to latch the pushed state register 207 output into the current state register 206. Guest translation then proceeds from the state where it had been previously suspended.

The Preferred Embodiment

Figure 5A:
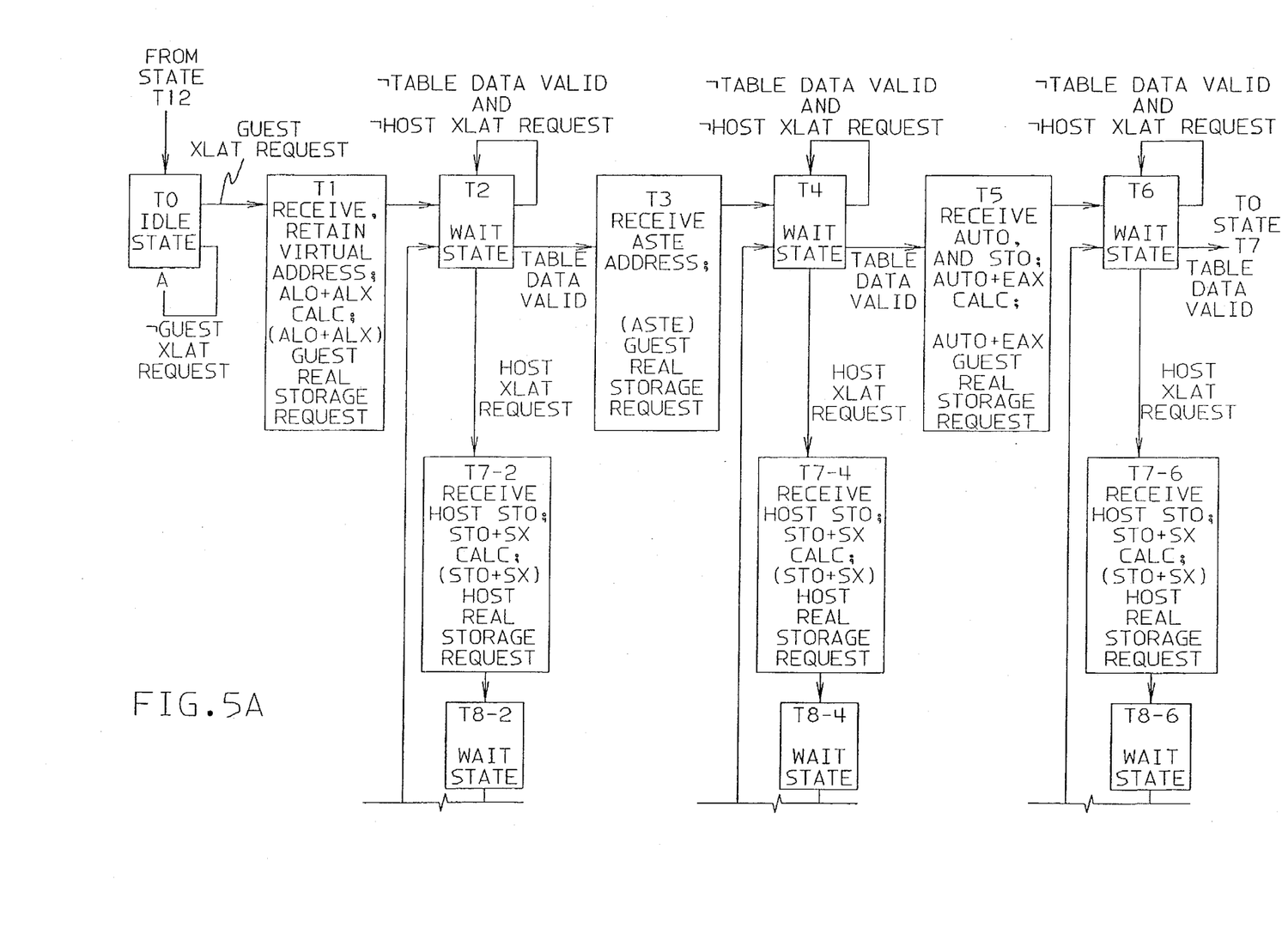
FIG. 5 shows the first part of the state transition diagram and FIG. 6 shows the second part.
Figure 5B:
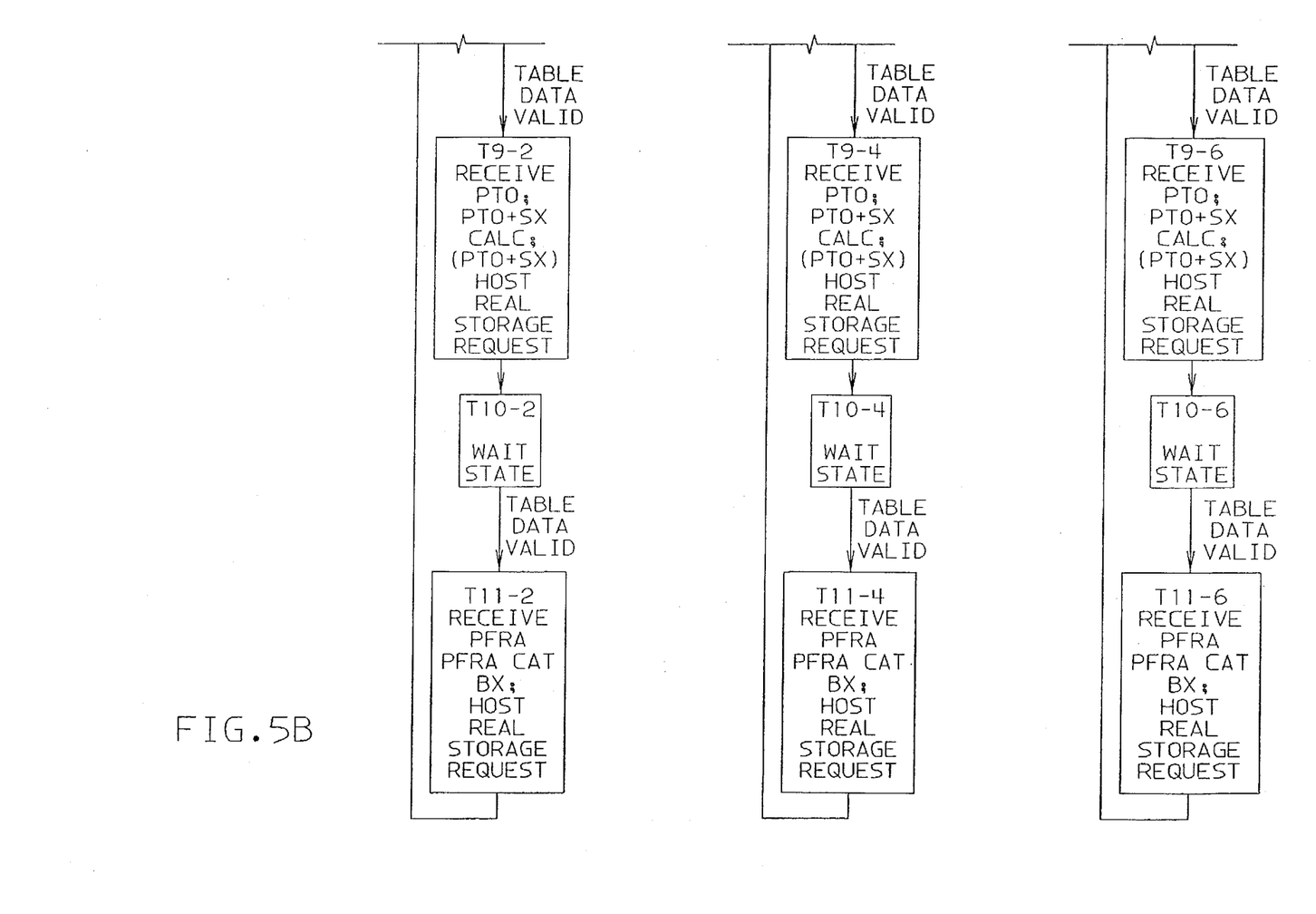
Figure 6A:
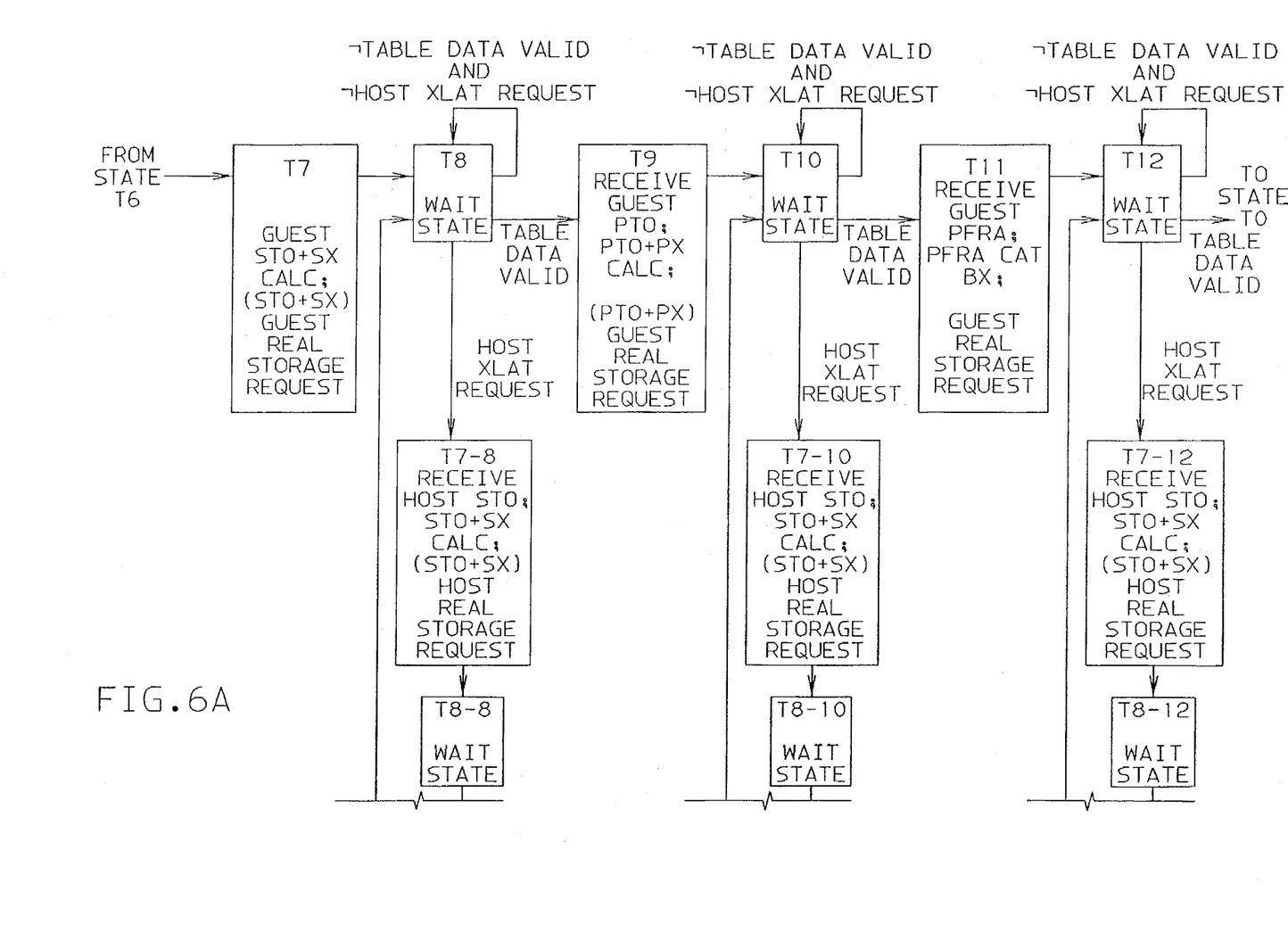
Figure 6B:
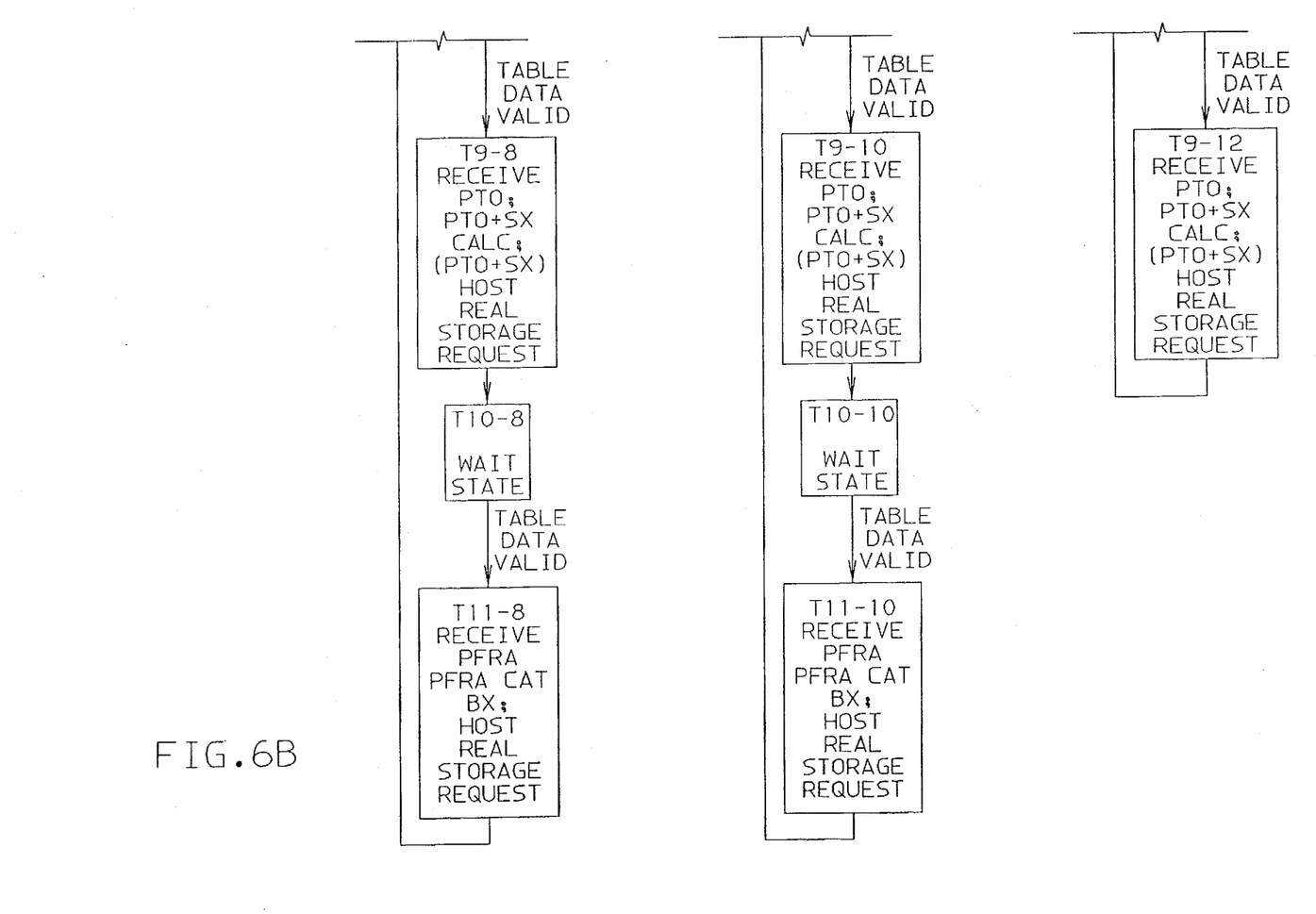

Turning now to our invention in greater detail, it will be seen from FIGS. 5 and 6 the preferred state sequences of a guest address translation The translator is initially in state TO, the idle state. A guest translation request from the translation resolution element 101, causes the translator to sequence to state T1. State T1 corresponds to a value of 1 in the current state register. In state T1, the guest virtual address is received and retained by the translator, the guest access list origin (ALO) and guest ALX portion of the guest virtual address are added, and the resulting address is output to the storage access element 105 which is instructed to access and return the requested table entry data. The translator then transitions to state T2, which is a wait state.

In state T2 the translator waits for one of two events, a table data valid indication or a host translation request. If the storage access element cannot return the requested data because the TLB did not contain the required host virtual to real translation then the translator will receive a host translation request. The host translation request causes the translator to sequence to state T7-2. State T7-2 corresponds to a value to 2 in the pushed state register and a value of 7 in the current state register. In state T7-2 the host virtual address is received and retained by the translator, the host STO is added to the host SX, and the resulting address is provided to the storage access element 105 which is instructed to access and return the requested table entry data. The translator then transitions to state T8-2, which is a wait state.

In state T8-2 the translator waits for the table data valid indication from the storage access element 105. The table data valid indication causes the translator to sequence to state T9-2. State T9-2 corresponds to a value to 2 in the pushed state register and a value of 9 in the current state register. In state T9-2 the table entry data (host PTO) is received and retained by the translator, the host PTO is added to the PX portion of the host virtual address, and the resulting address is provided to tile storage access element 105 which is instructed to access and return the requested table entry data. The translator then transitions to state T10-2 which is a wait state.

In state T10-2 the translator waits for the table data valid indication from the storage access element 105. The table data valid indication causes the translator to sequence to state T11-2. State T11-2 corresponds to a value to 2 in the pushed state register and a value of 11 in the current state register. In state T11-2 the table entry data (host PFRA) is received and retained by the translator, the host PFRA is concatenated with the BX portion of the host virtual address and the resulting address is provided to the storage access element 105 which is instructed to access and return the requested table entry data. The translator then transitions to back to state T2.

In state T2 the translator waits for the table data valid indication from the storage access element 105. The table data valid indication causes the translator to sequence to state T3. State T3 corresponds to a value to 3 in the pushed state register and a value of 0 in the current state register.

In state T3, the guest ASTE address (or origin) is received and retained by the translator and this address is provided to the storage access element 105 which is instructed to access and return the requested table entry data. (Note no address indexing was required in this case.) The translator then transitions to state 14, which is a wait state.

In state T4 the translator waits for one of two events, a table data valid indication or a host translation request. If the storage access element cannot return the requested data because the TLB did not contain the required host virtual to real translation then the translator will receive a host translation request. The host translation request causes the translator to sequence to state T7-4. State T7-4 corresponds to a value to 4 in the pushed state register and a value of 7 in the current state register. In state T7-4 the host virtual address is received and retained by the translator, the host STO is added to the host SX, and the resulting address is provided to the storage access element 105 which is instructed to access and return the requested table entry data. The translator then transitions to state T8-4, which is a wait state.

In state T8-4 the translator waits for the table data valid indication from the storage access element 105. The table data valid indication causes the translator to sequence to state T9-4. State T9-4 corresponds to a value to 4 in the pushed state register and a value of 9 in the current state register. In state T9-4 the table entry data (host PTO) is received and retained by the translator, the host PTO is added to the PX portion of the host virtual address, and the resulting address is provided to the storage access element 105 which is instructed to access and return the requested table entry data. The translator then transitions to state T10-4, which is a wait state.

In state T10-4 the translator waits for the table data valid indication from the storage access element 105. The table data valid indication causes the translator to sequence to state T11-4. State T11-4 corresponds to a value to 4 in the pushed state register and a value of 11 in the current state register. In state T11-4 the table entry data (host PFRA) is received and retained by the translator, the host PFRA is concatenated with the BX portion of the host virtual address and the resulting address is provided to the storable access element 105 which is instructed to access and return the requested table entry data. The translator then transitions to back to state 14.

In state T4 the translator waits for the table data valid indication from the storage access element 105. The table data valid indication causes the translator to sequence to state T5. State T5 corresponds to a value to 5 in the pushed state register and a value of 0 in the current state register.

In state T5, the guest AUTO authority table origin is received and retained by the translator and this origin is added to the EAX (extended authority index). The resulting address is provided to the storage access element 105 which is instructed to access and return the requested table entry data. The translator then transitions to state T6, which is a wait state.

In state T6 the translator waits for one of two events, a table data valid indication or a host translation request. If the storage access element cannot return the requested data because the TLB did not contain the required host virtual to real translation then the translator will receive a host translation request. The host translation request causes the translator to sequence to state T7-6. State T7-6 corresponds to a value to 6 in the pushed state register and a value of 7 in the current state register. In state T7-6 the host virtual address is received and retained by the translator, the host STO is added to the host SX, and the resulting address is provided to the storage access element 105 which is instructed to access and return the requested table entry data. The translator then transitions to state T8-6, which is a wait state.

In state T8-6 the translator waits for the table data valid indication from the storage access element 105. The table data valid indication causes the translator to sequence to state T9-6. State T9-6 corresponds to a value to 6 in the pushed state register and a value of 9 in the current state register. In state T9-6 the table entry data (host PTO) is received and retained by the translator, the host PTO is added to the PX portion of the host virtual address, and the resulting address is provided to the storage access element 105 which is instructed to access and return the requested table entry data. The translator then transitions to state T10-6, which is a wait state.

In state T10-6 the translator waits for the table data valid indication from the storage access element 105. The table data valid indication causes the translator to sequence to state T11-6. State T11-6 corresponds to a value to 6 in the pushed state register and a value of 11 in the current state register. In state T11-6 the table entry data (host PFRA) is received and retained by the translator, the host PFRA is concatenated with the BX portion of the host virtual address and the resulting address is provided to the storage access element 105 which is instructed to access and return the requested table entry data. The translator then transitions to back to state T6.

In state T6 the translator waits for the table data valid indication from the storage access element 105. The table data valid indication causes the translator to sequence to state T7. State T7 corresponds to a value to 7 in the pushed state register and a value of 0 in the current state register.

In state T7, the guest segment table origin (STO) is received and retained by the translator and added to the guest SX. The resulting address is provided to the storage access element 105 which is instructed to access and return the requested table entry data. The translator then transitions to state T8, which is a wait state.

In state T8 the translator waits for one of two events, a table data valid indication or a host translation request. If the storage access element cannot return the requested data because the TLB did not contain the required host virtual to real translation then the translator will receive a host translation request. The host translation request causes the translator to sequence to state T7-8. State T7-8 corresponds to a value to 8 in the pushed state register a value of 7 in the current state register. In state T7-8 the host virtual address is received and retained by the translator, the host STO is added to the host SX, and the resulting address is provided to the storage access element 105 which is instructed to access and return the requested table entry data. The translator then transitions to state T8-8, which is a wait state.

In state T8-8 the translator waits for the table data valid indication from the storage access element 105. The table data valid indication causes the translator to sequence to state T9-8. State T9-8 corresponds to a value to 8 in the pushed state register and a value of 9 in the current state register. In state T9-8 the table entry data (host PTO) is received and retained by the translator, the host PTO is added to the PX portion of the host virtual address, and the resulting address is provided to the storage access element 105 which is instructed to access and return the requested table entry data. The translator then transitions to state T10-8, which is a wait state.

In state T10-8 the translator waits for the table data valid indication from the storage access element 105. The table data valid indication causes the translator to sequence to state T11-8. State T11-8 corresponds to a value to 8 in the pushed state register and a value of 11 in the current state register. In state T11-8 the table entry data (host PFRA) is received and retained by the translator, the host PFRA is concatenated with the BX portion of the host virtual address and the resulting address is provided to the storage access element 105 which is instructed to access and return the requested table entry data. The translator then transitions to back to state T8.

In state T8 the translator waits for the table data valid indication from the storage access element 105. The table data valid indication causes the translator to sequence to state T9. State T9 corresponds to a value to 9 in the pushed state register and a value of 0 in the current state register.

In state T9, the guest PTO (page table origin) is received and retained by the translator and added to the guest PX. The resulting address is provided to the storage access element 105 which is instructed to access and return the requested table entry data. The translator then transitions to state T10, which is a wait state.

In state T10 the translator waits for one of two events, a table data valid indication or a host translation request. If the storage access element cannot return the requested data because the TLB did not contain the required host virtual to real translation then the translator will receive a host translation request. The host translation request causes the translator to sequence to state T7-10. State T7-10 corresponds to a value to 10 in the pushed state register and a value of 7 in the current state register. In state T7-10 the host virtual address is received and retained by the translator, the host STO is added to the host SX, and the resulting address is provided to the storage access element 105 which is instructed to access and return the requested table entry data. The translator then transitions to state T8-10, which is a wait state.

In state T8-10 the translator waits for the table data valid indication from the storage access element 105. The table data valid indication causes the translator to sequence to state T9-10. State T9-10 corresponds to a value to 10 in the pushed state register and a value of 9 in the current state register. In state T9-10 the table entry data (host PTO) is received and retained by the translator, the host PTO is added to the PX portion of the host virtual address, and the resulting address is provided to the storage access element 105 which is instructed to access and return the requested table entry data. The translator then transitions to state T10-10, which is a wait state.

In state T10-10 the translator waits for the table data valid indication from the storage access element 105. The table data valid indication causes the translator to sequence to state T11-10. State T11-10 corresponds to a value to 10 in the pushed state register and a value of 11 in the current state register. In state T11-10 the table entry data (host PFRA) is received and retained by the translator, the host PFRA is concatenated with the BX portion of the host virtual address and the resulting address is provided to the storage access element 105 which is instructed to access and return the requested table entry data. The translator then transitions to back to state T10.

In state T10 the translator waits for the table data valid indication from the storage access element 105. The table data valid indication causes the translator to sequence to state T11. State T11 corresponds to a value to 11 in the pushed state register and a value of 0 in the current state register.

In state T11, the guest page frame real address is received and retained by the translator and concatenated with the guest BX. This resulting address is provided to the storage access element 105 which is instructed to access and return the requested table entry data. (Note no address indexing was required in this case.) The translator then transitions to state T12, which is a wait state.

In state T12 the translator waits for one of two events, a table data valid indication or a host translation request. If the storage access element cannot return the requested data because the TLB did not contain the required host virtual to real translation then the translator will receive a host translation request. The host translation request causes the translator to sequence to state T7-12. State T7-12 corresponds to a value to 12 in the pushed state register and a value of 7 in the current state register. In state T7-12 the host virtual address is received and retained by the translator, the host STO is added to the host SX, and the resulting address is provided to the storage access element 105 which is instructed to access and return the requested table entry data. The translator then transitions to state T8-12, which is a wait state.

In state T8-12 the translator waits for the table data valid indication from the storage access element 105. The table data valid indication causes the translator to sequence to state T9-12. State T9-12 corresponds to a value to 12 in the pushed state register and a value of 9 in the current state register. In state T9-12 the table entry data (host PTO) is received and retained by the translator, the host PTO is added to the PX portion of the host virtual address, and the resulting address is provided to the storage access element 105 which is instructed to access and return the requested table entry data. The translator then transitions to back to state T12.

In state T12 the translator waits for the table data valid indication from the storage access element 105. The table data valid indication causes the translator to sequence to state T0, the idle state. Translator has now completed and the translator is waiting for the next translation request.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A recursive system for translating virtual host addresses to real addresses by means of a sequence of host translation steps, and translating virtual guest addresses to real addresses by means of a sequence of guest translation steps, comprising in combination:

a current translation state register for storing current translation state values;

a pushed translation state register for storing pushed translation state values; and an address translation sequencer generating, in response to inputs from said current translation state register, (a) said sequence of host translation steps, (b) said sequence of guest translation steps, (c) outputs to establish current state values stored in the current translation state register, (d) outputs to increment current state values stored in the current translation state register, (e) outputs to transfer a current state value stored in the current translation state register to the pushed translation state register, and (f) outputs to transfer pushed state values stored in the pushed state register to the current state register.

2. A recursive system for translating virtual host addresses to real addresses by means of a sequence of host translation steps, and translating virtual guest addresses to real addresses by means of a sequence of guest translation steps, comprising in combination:

a current translation state register for storing current translation state values;

a pushed translation state register for storing pushed translation state values;

an address translation sequencer generating, in response to inputs from said current translation state register, (a)

said sequence of host translation steps, (b) said sequence of guest translation steps, (c) outputs to establish current state values stored in the current translation state register, (d) outputs to increment current state values stored in the current translation state register, (e) outputs to transfer a current state value stored in the current translation state register to the pushed translation state register, and (f) outputs to transfer pushed state values stored in the pushed state register to the current state register; and said address translation sequencer translating a virtual guest address to real address by, (a) establishing a value in said current state translation register for an initial step in said sequence of guest translation steps, (b) sequencing the value in said current state translation register through succeeding steps to a value for an intermediate step in said sequence of guest translation steps, which intermediate step calls for a host translation operation, (c) establishing a value in said current state translation register for an initial step in said sequence of host translation steps for said host translation operation and transferring said value for an intermediate step to said push state translation register, (d) sequencing the value in said current state translation register for said host translation operation, and (e) transferring said value for said intermediate step from said push state translation register to said current state translation register.

* * * * *